United States Patent [19]
Didinsky

[11] Patent Number: 6,087,646
[45] Date of Patent: Jul. 11, 2000

[54] WIDE FIELD-OF-VIEW RADIATION SENSORS AND METHODS

[75] Inventor: Garry Didinsky, Los Angeles, Calif.

[73] Assignee: Hughes Electronics Corporation, El Segundo, Calif.

[21] Appl. No.: 09/107,752

[22] Filed: Jun. 30, 1998

[51] Int. Cl.[7] .................................................. G01C 21/02
[52] U.S. Cl. ........................................ 250/203.4; 244/164
[58] Field of Search .............................. 250/203.4, 203.6, 250/203.1, 216; 244/3.18, 3.21, 164, 171; 356/139.01, 139.03, 375; 126/573

[56] References Cited

U.S. PATENT DOCUMENTS

| | | | |
|---|---|---|---|
| 4,999,483 | 3/1991 | Okamoto et al. | 250/203.1 |
| 5,698,842 | 12/1997 | Fallon et al. | 250/203.4 |

OTHER PUBLICATIONS

Morgan, Walter L., et al., *Communications Satellite Handbook*, John Wiley & Sons, New York, 1989, pp. 648–649. (Month Unknown).

*Primary Examiner*—Que T. Le
*Attorney, Agent, or Firm*—T. Gudmestad; M. W. Sales

[57] ABSTRACT

Methods are provided for sensing radiation direction over a wide field-of-view. In one process step, radiation is received over a first solid angle and, in response, the direction of that radiation is sensed along a first sensor axis. In a similar process step, radiation is received over a second solid angle and, in response, the direction of that radiation is sensed along a second sensor axis. The first and second solid angles are arranged to spatially intersect over a third solid angle that is a subset of the first solid angle and a subset of the second solid angle. These methods facilitate the determination of inertial planes over a wide field-of-view and the third solid angle facilitates the determination of inertial vectors. Radiation sensor structures in accordance with the methods are also provided.

32 Claims, 5 Drawing Sheets

WIDE FIELD-OF-VIEW RADIATION SENSORS AND METHODS

BACKGROUND OF THE INVENTION

1. Field of the Invention

The present invention relates generally to spacecraft and more particularly to spacecraft radiation sensors.

2. Description of the Related Art

Figure 1:
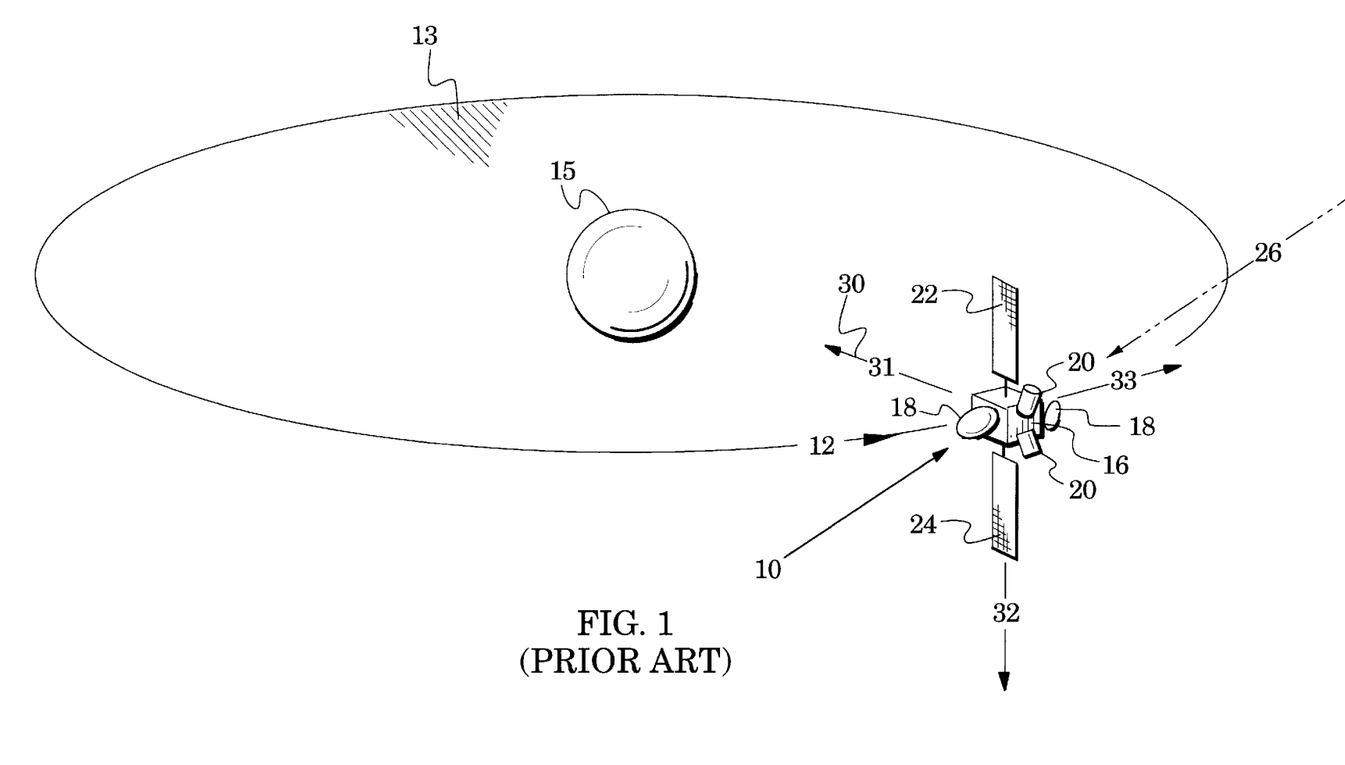
FIG. 1 is a perspective view of a satellite in orbit about the earth.

FIG. 1 illustrates an exemplary body-stabilized satellite 10 which travels along an orbit path 12 that defines an orbit plane 13 about the earth 15. Carried on or within the satellite's body 16 are various operational systems, e.g., a communications system which includes antennas 18, a propulsion system which includes thrusters 20 and an energy-generation system which includes solar wings 22 and 24.

Typically, a spacecraft must control its attitude in order to carry out system functions for which it was designed. In the case of the satellite 10, for example, the attitude of the satellite's body must be controlled to direct the antennas 18 towards the earth 15 and to arrange the solar wings 22 and 24 so that they can rotate daily and receive solar energy arriving along a sun line 26. In order to appropriately alter the satellite's attitude, (e.g., with on-board momentum wheels and/or the thrusters 20), its attitude must first be sensed and determined.

Satellite attitude is typically defined as the relationship between a coordinate frame of the satellite's body and an external coordinate frame such as the orthogonal orbit normal frame 30 of FIG. 1 which has a yaw axis 31 directed at the center of the earth 15, a pitch axis 32 that is orthogonal to the orbit plane 13 and a roll axis 33 in the direction of motion.

To find the attitude of a spacecraft, the directions of various radiation sources such as celestial sources (e.g., the earth, the sun and stars) and artificial sources (e.g., a radar beacon signal from an earth-based antenna) are sensed and the satellite's inertial attitude obtained relative to these radiaiton sources.

For example, an earth sensor can determine a nadir vector between a satellite and the earth's center. Knowledge of the nadir vector can be used to orient the roll-pitch plane of the satellite 10 of FIG. 1. However, because the nadir vector provides no attitude information relative to rotation about the yaw axis 31, an earth sensor is typically supplemented with a sun sensor which can determine the direction of the sun line 26 of FIG. 1.

Conventional sun sensors, however, typically have a limited field-of-view. Accordingly, sun sensors can only track the sun over a limited portion of an earth satellite's orbit and other attitude sensors (e.g., gyroscopes) are typically used for attitude determination over the remainder of the orbit. Because gyroscopes have a rate drift, more accurate attitude information from celestial radiation sensors (e.g., sun sensors) is generally used to calibrate them. If wider field-of-view radiation sensors were available, the gyroscopes could be calibrated over a greater portion of a satellite's orbit and relied upon over a smaller portion of the orbit (i.e., over a reduced time period). Because of both of these effects, the accuracy of satellite attitude determination would be enhanced.

Figure 2A:
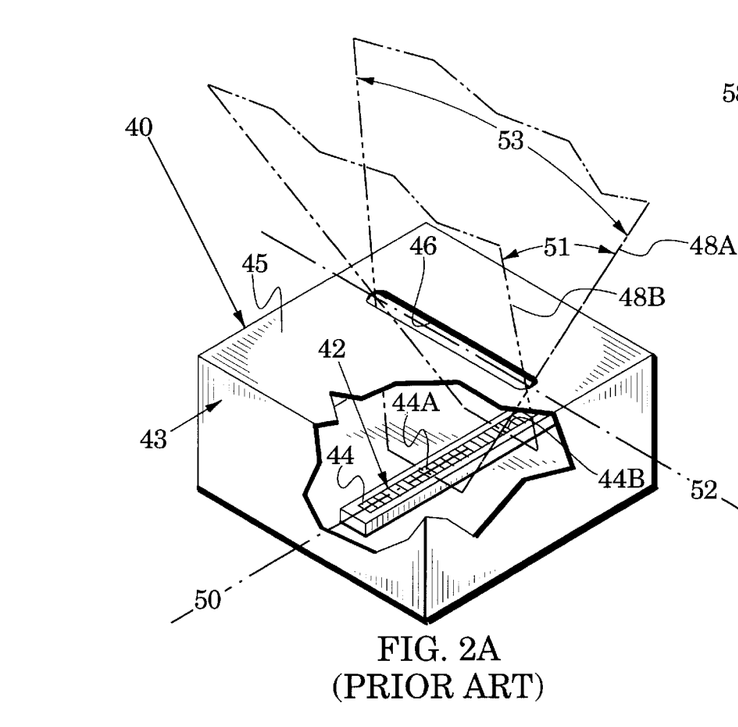
FIG. 2A is an isometric view of a conventional single-axis sun sensor.

Sun sensors have been described in various references (e.g., see Morgan, Walter L., et al., *Communications Satellite Handbook*, John Wiley & Sons, New York, 1989, pp. 648–649). An exemplary sun sensor structure 40 (e.g., see U.S. Pat. No. 4,999,483) is shown in FIG. 2A. The sun sensor 40 has a detector array 42 positioned within a sensor body 43. The detector array is formed with a plurality of detector elements 44. The body includes a shield member 45 which forms a radiation aperture 46.

With the sensor 40 in a first attitude with respect to the sun, a first radiation sheet 48A passes through the radiation aperture 46 and illuminates a detector element 44A in the detector array 42. When sensor 42 has a different second attitude with respect to the sun, a different second radiation sheet 48B is received through the radiation aperture 46 at a different angle and it illuminates a different detector element 44B in the detector array 42 (detailed optical effects (e.g., diffraction) are ignored in this brief description of radiation passage through the radiation aperture).

Along a sensor axis 50, therefore, illuminated detector elements are indicative of attitudes between the sun sensor 40 and the sun. For example, successive illumination of detector elements 44A and 44B indicates that attitude has changed over a sensor angle 51. Along an aperture axis 52, radiation is received over an aperture angle 53 but the sun's position along this axis is indeterminate.

Figure 2B:
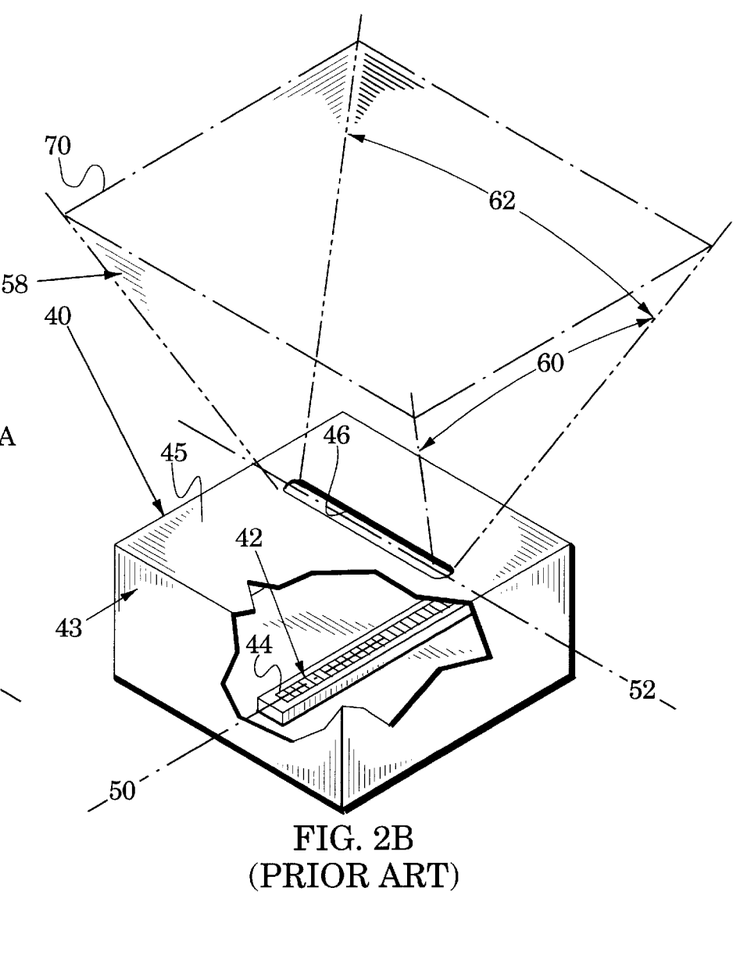
FIG. 2B is a view similar to FIG. 2A which illustrates a solid angle of radiation that is received by the single-axis sun sensor.

FIG. 2B is similar to FIG. 2A with like elements indicated by like reference numbers. FIG. 2B illustrates a radiation solid angle 58 which is received by the sun sensor 40 and which defines its field-of-view. The solid angle 58 includes a detector angle 60 along the sensor axis 50 and an aperture angle 62 along the aperture axis 52. In a specific sun sensor structure, the magnitudes of the detector angle 60 and the aperture angle 62 are functions of the spatial size of the sensor array 42 and the radiation aperture 46 and the spatial arrangement of these elements.

Figure 2C:
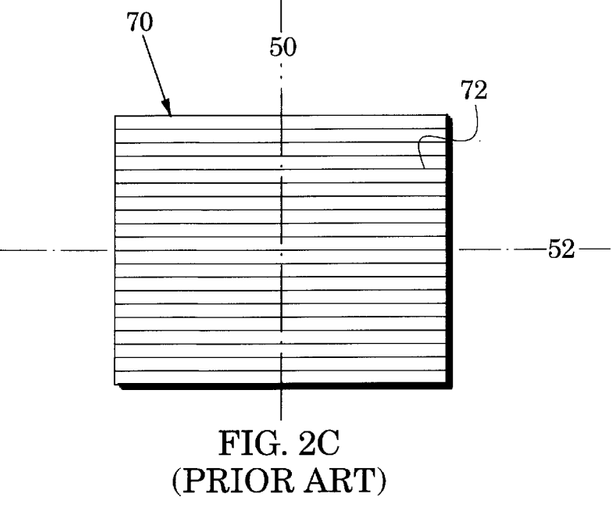
FIG. 2C is a plan view of a solid-angle cross section of FIG. 2B.

In FIG. 2B, the solid angle 58 has an exemplary solid-angle cross section 70 which is redrawn in FIG. 2C along with the sensor axis 50 and the aperture axis 52. For illustrative purposes, a series of sensor lines 72 are positioned across the solid-angle cross section 70. These sensor lines are orthogonal to the sensor axis 50 and they each correspond to a respective one of the detector elements (44 in FIG. 2A).

The spacing between the sensor lines 72 is a function of the spatial layout of the sun sensor (40 in FIG. 1A) and indicates the resolution of the sensor along the sensor axis 50. The horizontal extent of the sensor lines 72 is indicative of the field-of-view (at a respective solid-angle cross section) along the aperture axis 52. These sensor lines can be considered to define respective sensor planes in the sensor solid angle 58 of FIG. 2B. All of these sensor planes are orthogonal to the sensor axis 50.

Various sun sensor modifications have been proposed. In one conventional type of sun sensor, for example, each detector element (44 in FIG. 2A) is formed with a row of elements which are coded by a mask so that, when illuminated, they generate a digital code (e.g., a gray code) that is indicative of that respective attitude between the sensor and the sun.

Figure 2D:
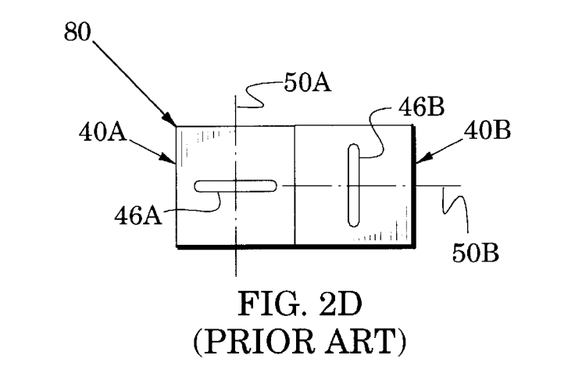
FIG. 2D is a plan view of a two-axis sun sensor that is formed with a pair of the single-axis sun sensors of FIG. 2A.

Two-axis sun sensors are typically formed by combining a pair of single-axis sun sensors. For example, the two-axis sun sensor 80 of FIG. 2D includes two single-axis sun sensors 40A and 40B which have been positioned in proximity to each other and with their sensor axes 50A and 50B in an orthogonal relationship. Accordingly, their sensor apertures 46A and 46B are also in an orthogonal relationship.

Figure 2E:
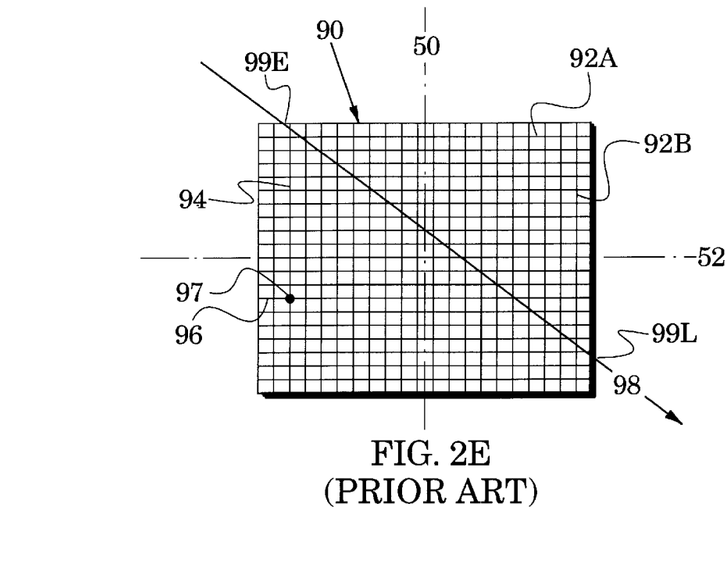
FIG. 2E is view similar to FIG. 2C which illustrates a radiation cross section in the sun sensor of FIG. 2D.

FIG. 2E shows a solid-angle cross section 90 for the two-axis sun sensor 80. This radiation cross section is similar to the cross section 70 of FIG. 2C in that it has a series of sensor lines 92A which are orthogonal to the sensor axis 50A and which correspond to sensor elements of the single-axis sun sensor 40A. In addition, it has a series of sensor lines 92B which are orthogonal to the sensor axis 50B and which correspond to sensor elements of the single-axis sun sensor 40B and which are orthogonal to the sensor lines 92A. Exemplary sensor lines 94 and 96 now uniquely determine an attitude point 97 (i.e., an attitude vector) in the radiation solid angle that is received by the two-axis sun sensor 90.

As mentioned above, however, conventional sun sensors have a limited field-of-view which degrades attitude determination because it increases the time over which attitude must be determined by less accurate means (e.g., gyroscopes). The limited field-of-view is apparent in FIG. 2E from an exemplary sun track 98 which enters and leaves the sensor's solid angle at attitude points 99E and 99L.

SUMMARY OF THE INVENTION

The present invention is directed to radiation sensors and methods which have a wide field-of-view. This goal is achieved by realizing that the planar determination of a single-axis sun sensor is generally sufficient for spacecraft attitude updating and only attitude search and acquisition processes require the vector determination of a two-axis sun sensor.

Accordingly, methods of the invention begin by receiving radiation over a first solid angle and, in response, sensing the direction of that radiation along a first sensor axis. In a similar process step, radiation is received over a second solid angle and, in response, the direction of that radiation is sensed along a second sensor axis. Finally, the first and second solid angles are arranged to spatially intersect over a third solid angle that is a subset of the first solid angle and a subset of the second solid angle. Preferably, the first and second sensor axes are positioned in an orthogonal relationship.

These methods facilitate the determination of inertial planes over a wider field-of-view than is possible with conventional radiation sensors. In addition, the third solid angle facilitates the determination of inertial vectors.

In one structural embodiment of the invention, a first single-axis radiation sensor is configured to receive radiation over a first solid angle and a second single-axis radiation sensor is configured to receive radiation over a second solid angle. The first and second radiation sensors are arranged so that only a portion of the first solid angle and a portion of the second solid angle spatially intersect. A wide field-of-view is facilitated by reducing the portions to be less than 50% of the first and second solid angles. The field-of-view is further enhanced by reducing these portions, e.g., to less than 20%. The first and second radiation sensors are configured to determine radiation direction respectively along first and second sensor axes which are in an arrangement other than colinear, e.g., in an orthogonal arrangement.

Radiation sensors of the invention have a wider field-of-view which can be used effectively in spacecraft applications. For example, these sensors facilitate calibration of gyroscopes over greater regions of satellite orbits and reduce the orbit regions in which gyroscopes must be relied upon for attitude control.

The novel features of the invention are set forth with particularity in the appended claims. The invention will be best understood from the following description when read in conjunction with the accompanying drawings.

DETAILED DESCRIPTION OF THE PREFERRED EMBODIMENTS

Figure 3:
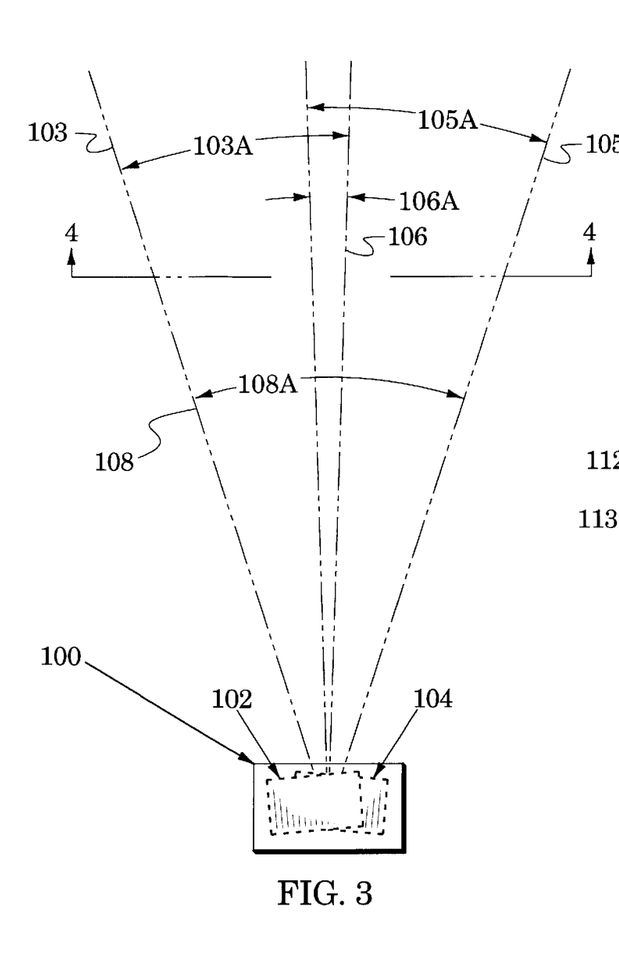
FIG. 3 is a side view of a two-axis sun sensor of the present invention.

FIG. 3 illustrates a two-angle sun sensor 100 which includes a pair of single-axis sun sensors 102 and 104. The sun sensor 102 receives radiation over a radiation solid angle 103 which subtends an angle 103A in the plane of FIG. 3. The sun sensor 104 receives radiation over a radiation solid angle 105 which subtends an angle 105A in the plane of FIG. 3. The single-axis sun sensors 102 and 104 are spatially arranged (e.g., by rotation along at least one spatial axis) so that only a portion of their radiation solid angles spatially intersect. That is, the solid angles 103 and 105 spatially intersect over a third solid angle 106 which subtends an angle 106A in the plane of FIG. 3. The third solid angle 106 is, therefore, a subset of the first solid angle 103 and a subset of the second solid angle 104.

Figure 4:
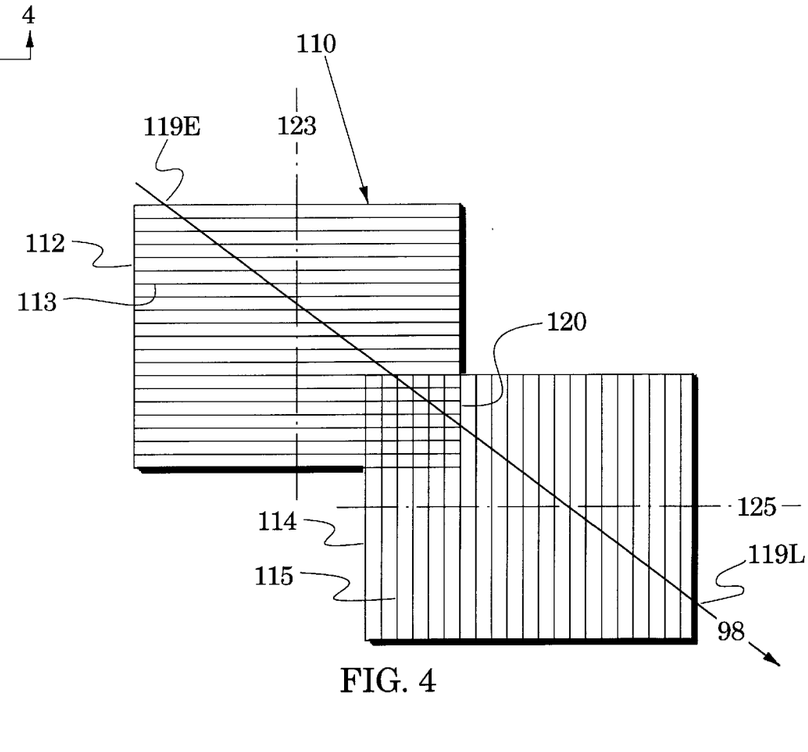
FIG. 4 is a solid-angle cross section along the plane 4—4 of FIG. 3.

Accordingly, the two-angle sun sensor 102 has a combined radiation solid angle 108 that subtends an angle 108A in the plane of FIG. 3 and which is formed by the intersecting radiation solid angles 103 and 104. In particular, FIG. 4 shows an exemplary cross section 110 (along the plane 4—4 of FIG. 3) of the radiation solid angles 103 and 105. In contrast to conventional sun sensors, the cross section 110 includes a pair of offset cross sections 112 and 114. The cross section 112 of the solid angle 103 has sensor lines 113 which each correspond to a respective detector element in the single-axis sun sensor 102. Similarly, the cross section 114 of the solid angle 105 has sensor lines 115 which each correspond to a respective detector element in the single-axis sun sensor 104.

Because of the invention's arrangement of the single-axis sun sensors 102 and 104, the cross sections 112 and 114 intersect over a smaller cross section 120 (i.e., the cross section 120 is a cross section of the solid angle 106 of FIG. 3). Accordingly, the cross section 120 is defined in FIG. 4 as the area which has both sensor lines 113 and sensor lines 115. In the illustrated embodiment of the invention, the sun sensors 102 and 104 are positioned so that the sensor lines 113 and 115 are orthogonally arranged.

The exemplary sun track 98 of FIG. 2E is shown again in FIG. 4. The sun track enters and leaves the sensor's radiation solid angle (108 in FIG. 3) at attitude points 119E and 119L. Relative to the conventional sun sensor 80 of FIG. 2D, it is apparent that the field-of-view is significantly increased in the sun sensor 100 of FIG. 3.

The enhanced field-of-view of the invention is obtained with the realization that spacecraft attitude control does not always require that a sun sensor determine an inertial vector. In particular, attitude search and acquisition are facilitated by such a determination but determination of an inertial plane is sufficient to facilitate attitude update (i.e., updates subsequent to attitude acquisition).

For attitude update, a determined inertial plane can be supplemented by sensing an inertial vector with another sensor source. That source can be, for example, an earth sensor which locates the earth's horizon against the background of space by detecting infrared radiation (e.g., at wavelengths of ~15 μm). An earth sensor essentially determines a nadir vector, i.e., an vector between the satellite and the earth's center.

Because space is three dimensional, the determination of spacecraft attitude requires three independent attitude indicators. An inertial plane supplies a single independent attitude indicator and an inertial vector supplies two independent attitude indicators. Thus, spacecraft attitude can be obtained with an inertial plane and an independent inertial vector.

In the radiation solid angle 103 of FIG. 3, the single-axis sun sensor 102 determines radiation direction along a sensor axis 123 of FIG. 4 which is orthogonal to the resolution-indicating sensor lines 113. In a similar manner, the single-axis sun sensor 102 determines radiation direction along a sensor axis 125 which is orthogonal to the resolution-indicating sensor lines 115. Thus, the sun sensor 102 can determine an inertial plane in the solid angle 103 that is parallel to the sensor lines 113 and can determine an inertial plane in the solid angle 105 that is parallel to the sensor lines 115. In contrast, the sensor 100 can determine an inertial vector in the radiation solid angle 106 of FIG. 3 that corresponds to the cross section 120 of FIG. 4.

The sun sensor 100 can therefore be used for attitude update over the extended solid angle 108 of FIG. 3. Only during attitude search and acquisition (when other attitude indicators such as an earth sensor are absent), is use of the sensor generally restricted to the solid angle 106.

The enhanced field-of-view that is particularly illustrated by the sun track 98 in FIG. 4 can be extended by causing the solid angle 106 to be less than a selected portion (e.g., 50%) of the first solid angle 103 and less than a selected portion (e.g., 50%) of the second solid angle 105. The field-of-view can be further enhanced by reducing the selected portions to a lesser value (e.g., 20%).

Figure 5:
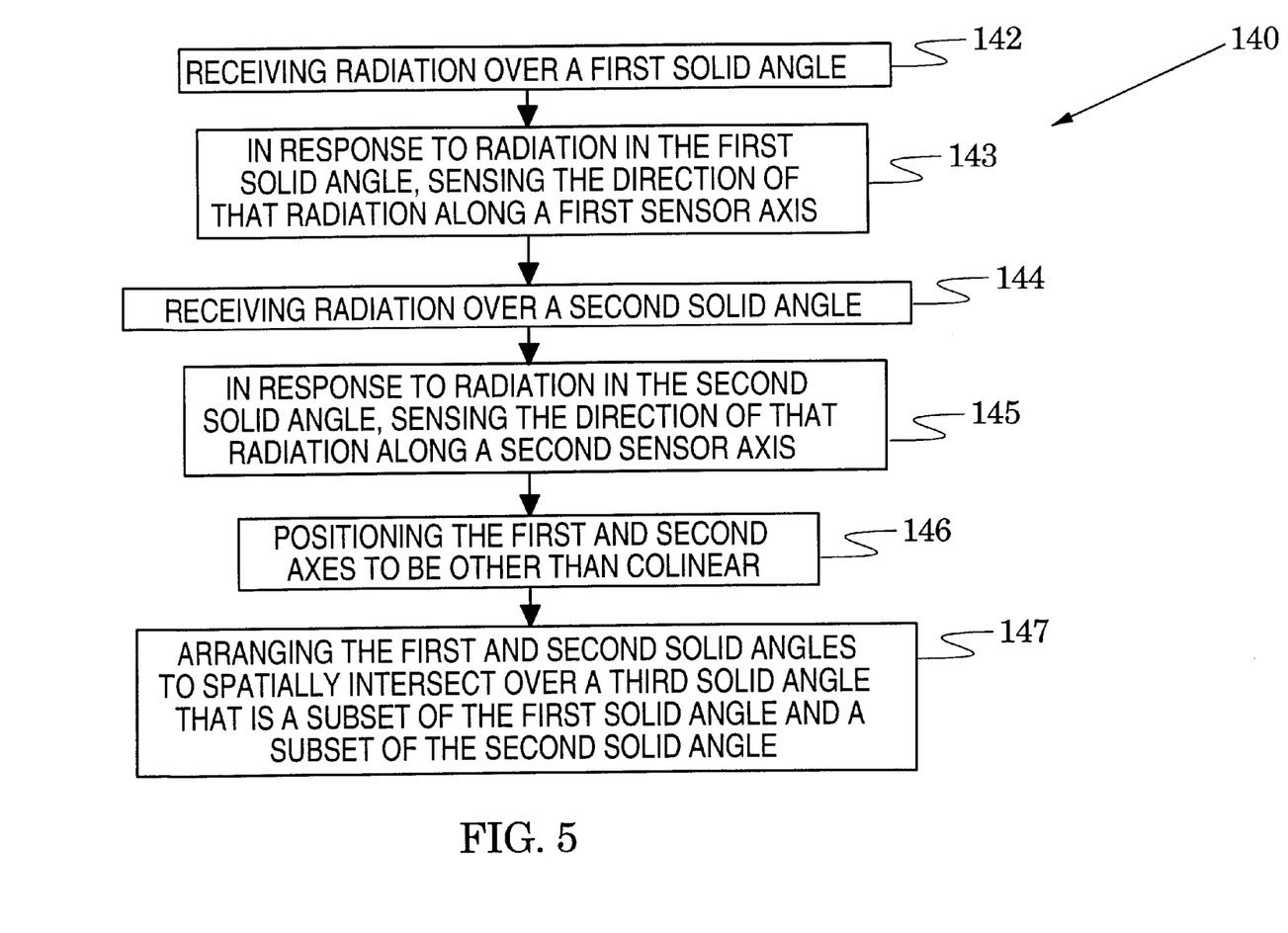
FIG. 5 is a flow chart which illustrates operational processes of the sun sensor of FIG. 3.

Functional operation of the radiation sensor 100 of FIG. 3 is summarized in the flow chart 140 of FIG. 5. In a first process step 142, radiation is received over a first solid angle. In response to radiation in the first solid angle, the direction of that radiation is sensed in process step 143 along a first sensor axis. Process steps 144 and 145 are similar to steps 142 and 143 except that the radiation is received over a second solid angle and the direction of that radiation is sensed along a second sensor axis.

The first and second axes are positioned to be other than colinear in process step 146. In process step 147, the first and second solid angles are arranged to spatially intersect over a third solid angle that is a subset of the first solid angle and a subset of the second solid angle.

Sun sensors of the invention provide attitude angles in a sun sensor coordinate frame, e.g., angles α and β along respectively the sensor axes 123 and 125 in FIG. 4. In general, a sun sensor's coordinate frame is not aligned with a spacecraft's body coordinate frame. However, the sun sensor's attitude angles can be transformed into attitude angles $\alpha^B$ and $\beta^B$ in the spacecraft's body coordinate frame.

In particular, a sun vector can be written as $$\hat{s} = \frac{C_{b\_ss}}{\sqrt{1+[\tan\alpha]^2+[\tan\beta]^2}} \begin{bmatrix} \tan\alpha \\ \tan\beta \\ 1 \end{bmatrix}$$

in which $C_{b\_ss}$ is a coordinate transfer matrix between the sun sensor frame and the body frame and angles α and β are angles in the sensor frame which describe the sun's position.

To illustrate the invention's application to spacecraft and to provide illustrative methods for its utilization, an exemplary attitude determination algorithm is now outlined.

In the third solid angle 106 of FIG. 3, the sun vector can be constructed exactly. In regions of the solid angle 108 of FIG. 3 that lie outside of the third solid angle 106, spacecraft body attitude can be computed using another inertial vector (e.g., from an earth sensor or a beacon sensor).

The problem of determining attitude from a two-dimensional attitude measurement and a one-dimensional measurement can be referred to as a 2-1 problem. It can be formulated as follows:

a) given two measurements of,
  1) a two-dimensional vector measurement $s_1$ and its reference vector $r_1$, and
  2) a one-dimensional planar measurement $p_2$ and its reference vector $r_2$;
b) find a coordinate transformation matrix C which satisfies the conditions of;
  1. $s_1 = Cr_1$, and
  2. $p_2^T Cr_2 = 0$.

An algorithm that solves the 2-1 problem is described below wherein it is first noted that a coordinate transformation matrix can be written as $$C(x,\theta) = xx^T + (I-xx^T)\cos\theta + Skew(x)\sin\theta$$

in which x is the Euler axis of rotation, θ is the rotation angle, I is an identity matrix and $$Skew(x) = \begin{pmatrix} 0 & -x_3 & x_2 \\ x_3 & 0 & -x_1 \\ -x_2 & x_1 & 0 \end{pmatrix}.$$

The set of all coordinate transformation matrices that map $r_1$ into $s_1$ can be parametrized as $$C(s_1, r_1, \theta) = C(s_1, \theta) \cdot [2\xi\xi^T - I]$$

in which $$\xi = \frac{s+r}{\sqrt{2+2s^T r}}.$$

In addition, $$p_2^T C(s_1, r_1, \theta) r_2 = a + b\cos\theta + c\cos\theta$$

in which $$a = (p_2^T s_1) s_1^T (2\xi(\xi^T r_2) - r_2),$$

$$b = -((p_2^T s_1) s_1^T - p_2^T)(2\xi(\xi^T r_2), \text{ and}$$

$$c = (s_1 + p_2)^T (2\xi(\xi^T r_2) - r_2).$$

It is seen, therefore, that the 2-1 problem can be rewritten as the minimization problem of $$\min_\theta |a + b\cos\theta + c\sin\theta|$$

in which the minimum value must equal zero. If it is not zero, then the 2-1 problem is either ill posed or has no solution. The above minimization problem has a solution of, 1. Case of $b^2 + c^2 - a^2 \leq 0$: In this case, the minimum value is positive and for the optimum value of $\theta$, $$\sin\theta = -sgn(a) \cdot \frac{c}{\sqrt{b^2 + c^2}} \text{ and}$$

$$\cos\theta = -sgn(a) \cdot \frac{b}{\sqrt{b^2 + c^2}}.$$

2. Case of $b^2 + c^2 - a^2 \geq 0$: In this case, the minimum value is zero. For the optimum value of $\theta$ (there are two solutions), $$\sin\theta = \frac{-ac \pm b\sqrt{b^2 + c^2 - a^2}}{b^2 + c^2} \text{ and}$$

$$\cos\theta = \frac{-ab \pm c\sqrt{b^2 + c^2 - a^2}}{b^2 + c^2}.$$

Solution to the 2-1 problem is now the matrix $C(s_1, r_1, q)$ in which $\theta$ is the solution to the minimization problem above. A method of discriminating between the two possible solutions may be based on comparing the matrix C to its estimate or, by rejecting a solution if it falls outside of the sensor's field-of-view, or through a ground command.

Although first and second single-axis radiation sensors can be positioned to form radiation sensors of the invention, the teachings of the invention can be practiced with any aperture and detector array structures that can be arranged to realize the sensor steps recited in FIG. 5. The first and second sensor axes sensor axes may have any spatial relationship (e.g., orthogonal) other than a colinear one.

The detector arrays of the invention may be realized with any conventional radiation detector structures, e.g., photodiodes, charge-coupled devices (CCD's) and piezoelectric devices.

Although the teachings of the invention have been illustrated with reference to a sun sensor, they may be applied to any radiation sensor.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A radiation sensor system having a wide field-of-view, comprising a two-axis radiation sensor configured to determine, over a first solid angle, a radiation source direction along a first detector axis and to determine, over a second solid angle, said radiation source direction along a second detector axis wherein said first and second detector axes are not colinear and said first and second solid angles intersect over a third solid angle that is a subset of each of said first and second solid angles.

2. The radiation sensor of claim 1, wherein said two-axis radiation sensor includes:
   a first single-axis radiation sensor configured to receive radiation over said first solid angle; and
   a second single-axis radiation sensor configured to receive radiation over said second solid angle.

3. The radiation sensor of claim 1, wherein said third solid angle is less than 50% of said first solid angle and less than 50% of said second solid angle.

4. The radiation sensor of claim 1, wherein said third solid angle is less than 20% of said first solid angle and is less than 20% of said second solid angle.

5. The radiation sensor of claim 1, wherein said first and second detector axes are in an orthogonal relationship.

6. A radiation sensor having a wide field-of-view, comprising:
   a shield;
   at least one radiation aperture formed by said shield; and
   at least one detector array positioned to receive radiation through said aperture;
   said detector array being arranged to receive radiation over a first solid angle and said radiation aperture arranged to facilitate determination of radiation direction along a first sensor axis; and
   said detector array also being arranged to receive radiation over a second solid angle and said radiation aperture also arranged to facilitate determination of radiation direction along a second sensor axis;
   wherein said first and second axes are not colinear and said first and second solid angles intersect over a third solid angle that is a subset of each of said first and second solid angles.

7. The radiation sensor of claim 6, wherein said detector array and said radiation aperture form:
   a first single-axis radiation sensor that receives radiation over said first solid angle; and
   a second single-axis radiation sensor that receives radiation over said second solid angle.

8. The radiation sensor of claim 6, wherein said third solid angle is less than 50% of said first solid angle and less than 50% of said second solid angle.

9. The radiation sensor of claim 6, wherein said third solid angle is less than 20% of said first solid angle and less than 20% of said second solid angle.

10. The radiation sensor of claim 6, wherein said first and second detector axes are in an orthogonal relationship.

11. A radiation sensor having a wide field-of-view, comprising:
    a first single-axis radiation sensor configured to receive radiation over a first solid angle; and
    a second single-axis radiation sensor configured to receive radiation over a second solid angle wherein said first and second radiation sensors are arranged so that only a first portion of said first solid angle and a second portion of said second solid angle spatially intersect, and the sensor axes of said first and second radiation sensors are not colinear.

12. The radiation sensor of claim 11, wherein said first portion is less than 50% of said first solid angle and said second portion is less than 50% of said second solid angle.

13. The radiation sensor of claim 11, wherein said first portion is less than 20% of said first solid angle and said second portion is less than 20% of said second solid angle.

14. The radiation sensor of claim 11, wherein said first and second radiation sensors each include:

a shield member;

a radiation aperture defined by said shield member; and a plurality of radiation detectors positioned to receive radiation through said aperture.

15. The radiation sensor of claim 14, wherein said radiation detectors are photodiodes.

16. The radiation sensor of claim 14, wherein said radiation detectors are charge-coupled devices.

17. The radiation sensor of claim 14, wherein said radiation detectors are piezo-electric devices.

18. The radiation sensor of claim 14, wherein said radiation detectors are arranged in a detector array.

19. The radiation sensor of claim 11, wherein:

said first radiation sensor is configured to determine radiation direction along a first axis;

said second radiation sensor is configured to determine radiation direction along a second axis; and said first and second radiation sensors are positioned so that said first and second axes are not colinear.

20. The radiation sensor of claim 19, wherein said first and second axes are in a substantially orthogonal configuration.

21. A spacecraft system, comprising:

a spacecraft; and a wide field-of-view radiating-body sensor carried by said spacecraft, said wide field-of-view radiating-body sensor having:
   a) a first single-axis radiation sensor configured to receive radiation over a first solid angle; and
   b) a second single-axis radiation sensor configured to receive radiation over a second solid angle wherein said first and second single-axis radiation sensors are positioned so that only a first portion of said first solid angle and a second portion of said second solid angle spatially intersect, and the sensor axes of said first and second radiation sensors are not colinear.

22. The spacecraft system of claim 21, wherein said first portion is less than 50% of said first solid angle and said second portion is less than 50% of said second solid angle.

23. The spacecraft system of claim 21, wherein said first portion is less than 25% of said first solid angle and said second portion is less than 25% of said second solid angle.

24. The spacecraft system of claim 21, wherein said first and second radiation sensors each include:

a shield member;

an aperture defined by said shield member; and a plurality of radiation detectors positioned to receive radiation through said aperture.

25. The spacecraft system of claim 21, wherein:

said first radiation sensor is configured to determine radiation direction along a first axis;

said second radiation sensor is configured to determine radiation direction along a second axis; and said first and second radiation sensors are positioned so that said first and second axes are not colinear.

26. The spacecraft system of claim 25, wherein said first and second axes are in a substantially orthogonal configuration.

27. The spacecraft system of claim 21, wherein said spacecraft further includes:

solar panels positioned to receive solar energy;

an antenna for signal reception and transmission; and thrusters for control of spacecraft attitude.

28. A method of sensing radiation direction over a wide field-of-view, comprising the steps of:

receiving said radiation over a first solid angle;

in response to radiation in said first solid angle, sensing the direction of that radiation along a first sensor axis;

receiving said radiation over a second solid angle;

in response to radiation in said second solid angle, sensing the direction of that radiation along a second sensor axis; and arranging said first and second solid angles to spatially intersect over a third solid angle that is a subset of said first solid angle and a subset of said second solid angle, and the sensor axes are not colinear.

29. The method sensor of claim 28, further including the step of positioning said first and second axes to be other than colinear.

30. The method of claim 28, further including the step of positioning said first and second axes in an orthogonal relationship.

31. The method of claim 28, wherein said third solid angle is less than 50% of said first and second solid angles.

32. The method of claim 28, wherein said third solid angle is less than 20% of said first and second solid angles.

* * * * *